United States Patent [19]

Kanada et al.

[11] Patent Number: 4,589,920

[45] Date of Patent: May 20, 1986

[54] INK COMPOSITION UTILIZED IN LITHOGRAPHIC PRINTING AND A LITHOGRAPHIC PRINTING PROCESS

[75] Inventors: Eiji Kanada; Toshiro Kondo, both of Nagaokakyo; Kenichi Isobe, Annaka, all of Japan

[73] Assignees: Mitsubishi Paper Mills, Ltd.; Shin-Etsu Chemical Ltd., both of Tokyo, Japan

[21] Appl. No.: 540,170

[22] Filed: Oct. 7, 1983

[30] Foreign Application Priority Data

Oct. 8, 1982 [JP] Japan ............................ 57-177141
Oct. 8, 1982 [JP] Japan ............................ 57-177142
Jul. 7, 1983 [JP] Japan ............................ 58-123670

[51] Int. Cl.$^4$ ............................................ C09D 11/08
[52] U.S. Cl. ................................. 106/30; 106/20; 106/25; 106/26; 106/29; 106/31
[58] Field of Search ................. 106/20, 25, 26, 30, 106/29, 31

[56] References Cited

U.S. PATENT DOCUMENTS

| | | | |
|---|---|---|---|
| 3,877,372 | 4/1975 | Leeds ................................. | 106/2 |
| 3,948,827 | 4/1976 | Noshiro et al. ................... | 524/188 |
| 4,115,329 | 9/1978 | Noshiro et al. ................... | 524/27 |
| 4,304,601 | 12/1981 | Sharp ................................. | 106/30 |
| 4,374,036 | 2/1983 | Canale et al. .................... | 252/174.16 |

Primary Examiner—Amelia B. Yarbrough
Attorney, Agent, or Firm—Cushman, Darby & Cushman

[57] ABSTRACT

Use of an ink composition containing an organopolysiloxane having at least one hydrophilic group can bring about such a lithographic printing using a dampening solution as the non-image area is hardly stained, the image area is given a sufficient density, emulsification hardly occurs and tolerance for change of printing conditions is high.

22 Claims, No Drawings

INK COMPOSITION UTILIZED IN LITHOGRAPHIC PRINTING AND A LITHOGRAPHIC PRINTING PROCESS

This invention relates to an ink composition utilized in lithographic printing using a dampening solution and to a lithographic or offset printing process using a dampening solution.

Lithographic printing plates consist of a lipophilic image area accepting an oil-based ink and an oil-repellent non-image area not accepting the ink. In general, the non-image area is constituted by a hydrophilic area accepting water. Accordingly, ordinary lithographic printing is conducted by supplying both a colored ink and water to the surface of a printing plate whereby the ink and the water are selectively accepted by the image area and the non-image area of the plate, respectively, and thereafter by transferring the ink on the image area onto a substrate such as, for example, a paper. As plates for lithographic printing using a dampening solution are known the presensitized plate (the so-called PS plate) using a diazonium compound, the lithographic printing plate due to electrophotography using zinc oxide or an organic photoconductive substance, the lithographic printing plate due to silver-salt-based photography using a silver halide emulsion as a photosensitive component, and the like. Also, a variety of printing inks are used in lithography using the above printing plates. These conventional inks can give good printed matters in limitted printing plates or limitted dampening solutions, but cause various problems or in extreme cases become unusable when kinds of printing plates or dampening solutions and printing conditions employed are changed. The printing inks for lithography are required to have properties that they adhere to an image area in a sufficient amount and do not adhere at all to a non-image area without forming an emulsion with a dampening solution. Further, these inks are desired, as mentioned above, not to be affected by the change of kinds of printing plates or dampening solutions as well as by the change of printing conditions.

An object of this invention is to provide a printing ink composition satisfying the above requirements for use in lithographic printing using a dampening solution.

When an ink additive is added to an ink composition product such as a commercially available printing ink in order to modify properties of the ink, the additive is required not to cause problems such as emulsification and property deterioration of the ink due to incomplete and non-uniform mixing between the additive and the ink.

Another object of this invention is to provide such a lithographic printing process using a dampening solution that can satisfy the above mentioned requirements.

The present inventors made strenuous efforts to achieve the above object and as a result have found out that use of an ink composition containing one of the following specific compounds can bring about such a lithographic printing process using a dampening solution as the non-image area is hardly stained, the image area is given a sufficient density, emulsification hardly occurs and tolerance for change of printing conditions is high. These specific compounds are organopolysiloxanes having a hydrophilic group or groups. Use of an organopolysiloxane in an ink composition for dry lithography is known in, for example, Japanese Patent Laid-Open Publication No. 4107/1973. But, most of a large number of organopolysiloxanes available had been unable to give good printed matters, when they are contained in commercially available printing inks and these inks are printed through a lithographic printing plate using a dampening solution (for example, a PS plate). That is, when these organopolysiloxanes are used in printing inks for lithographic printing process using a dampening solution, there is no background staining but the image area can not pick up a sufficient amount of an ink, or there is background staining and further the image area does not pick up a sufficient amount of an ink, or the image area can pick up a sufficient amount of an ink but the background is stained heavily, or emulsification occurs. In view of these problems of conventional ink compositions for lithographic printing using a dampening solution, the present inventors conducted extensive studies and found out the presence of a functional group having a relatively high affinity with water, namely, a hydrophilic group or groups in organopolysiloxanes plays an important role in solving said problems. This finding led to the present invention. As described in the above referred Japanese Patent Laid-Open publication No. 4107/1973, organopolysiloxanes are known to act as a reducing agent for adhesivity of an ink to a non-image area and thereby to effectively reduce background staining of a printing plate for dry lithographic printing. But, it has been unpredictable that, in a plate for lithographic printing using a dampening solution and an ink composition containing an organopolysiloxane of the present invention having a hydrophilic group or groups, emulsification and background staining occur hardly and the sufficient printing density of the image area is assured.

Organopolysiloxanes used in the ink composition of this invention have no restriction in structure, molecular weight, kinds and numbers of organic groups other than hydrophilic groups, etc., as long as these organopolysiloxanes possess a hydrophilic group moiety and a siloxane moiety within their molecules.

The organopolysiloxane used in the ink composition of the present invention contains at least one of components represented by $\{(R)SiO(G)\}$, $\{(G)(R)_2SiO_{\frac{1}{2}}\}$, $\{(G)SiO_{3/2}\}$, etc., wherein R is a substituent such as a non-substituted or substituted alkyl group, alkoxy group, aromatic group or the like and may be same or different, and G is a hydrophilic group or a group containing the hydrophilic group.

As examples of the hydrophilic group there can be mentioned hydroxyl group, carboxyl group, sulfonic acid group, thiol group, amino group, ammonium group, etc. Particularly preferred hydrophilic groups are groups at least having a hydroxyl group derived from a polyol compound. Examples of this polyol compound include alkylene glycols (ethylene glycol, propylene glycol, etc.), polyalkylene glycols (polyethylene glycol, polypropylene glycol, etc.), glycerol, mannitol, sorbitol, sucrose, glucose, sorbitan, etc. Even if these are heated with, for example, an alkyd resin to be converted into condensation products, their hydrophilic groups do not lose properties as such and therefore these hydrophilic groups can be utilized in the form of a variety of compounds. Hydrophilic groups giving better results are polyoxyalkylene groups such as polyoxyethylene group. As other hydrophilic groups, there may be used such groups as $-R'SO_3M$, $-R'N^{\oplus}(R'')_3X^{\ominus}$, $-R'(NHCH_2CH_2)_yNH_2$, $-R'COOM$, $-R'SH$, $-R'OH$ wherein $R'$ is a divalent organic group, $R''$ is a hydrogen atom or an alkyl group, X is a halogen atom, M is a hydrogen atom or an alkali metal and y is an integer of 1 to 40.

Representative examples of the organopolysiloxane used in the present invention are shown by the following four average composition formulas (A) to (D).

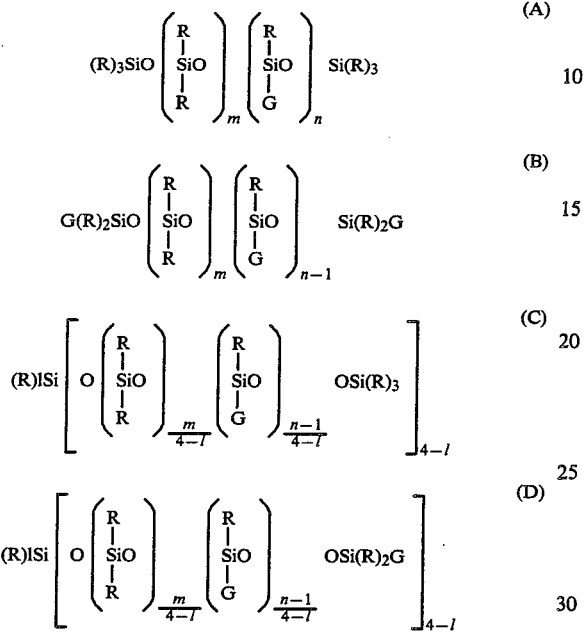

In the above formulas, m is an average value of 0 to 100, n is an average value of 1 to 50, l is an average value of 0 to 1, and R and G are groups mentioned already. A preferred example of R is a hydrocarbon group of 1 to 10 carbon atoms having no aliphatic unsaturated bond. Preferred examples of G are $-R'O(C_2H_4O)_x(C_3H_6O)_zR'''$ and

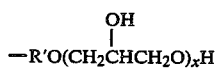

wherein R' is a divalent organic group, R''' is an alkyl group of 8 or less carbon atoms, an acyl group or a hydrogen atom, x is an average value of 1 to 40 and z is an average value of 0 to 40.

Specific examples of the organopolysiloxane used in the present invention are shown below.

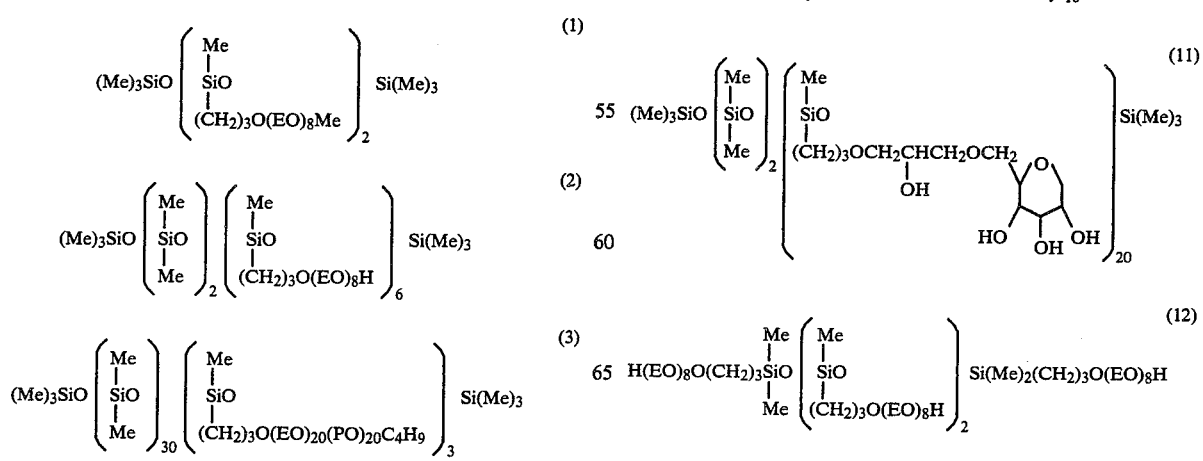

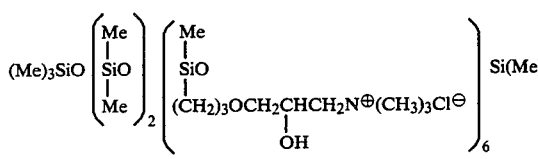

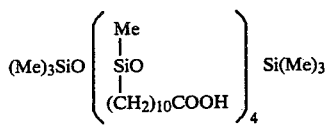

In the above formulas, Me is an methyl group, EO is ($C_2H_4O$) and PO is ($C_3H_6O$).

More preferred organopolysiloxanes are those which contain at least one substituent (M) and at least one substituent (N), as G of the average composition formulas (A) to (D) aforementioned. Here, the substituent (M) is represented by the formula $$-C_xH_{2x}O(CH_2CH_2O)_a(CH_2\underset{\underset{CH_3}{|}}{C}HO)_bR'$$

wherein x is an integer of 0 to 4, a is an average value of 1 to 50, b is an average value of 0 to 50 and R' is a hydrogen atom, an alkyl group or an acyl group; and the substituent (N) is represented by the formula

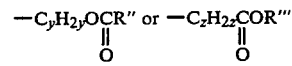

wherein y is an integer of 0 to 4, R" and R''' are a saturated or unsaturated hydrocarbon of 1 to 30 carbon atoms having no terminal unsaturated bond and z is an integer of 2 to 30.

More specifically, in the aforementioned formulas (A) to (D), m is an average value of 0 to 100, n is an average value of 1 to 50, l is an average value of 0 to 1, and R is an unsubstituted or substituted alkyl group, alkoxy group, aromatic group or the like and its preferred examples are methyl group, phenyl group and trifluoropropyl group. G is a mixture of the substituent (M) and the substituent (N) both shown above. In a preferred example of the substituent (M), x is 3, a is 3 to 10, b is 1 to 3, a/(a+b) is 0.75 to 1.00 and R' is a hydrogen atom or a methyl group. In a preferred example of the substituent (N), y is 3, R" is $C_{11}H_{23}$, $C_{13}H_{27}$, $C_{15}H_{31}$, $C_{17}H_{35}$, $C_{11}H_{21}$, $C_{13}H_{25}$, $C_{15}H_{29}$, $C_{17}H_{33}$, $C_{19}H_{37}$ or $C_{17}H_{31}$; or, z is 9 or 10 and R''' is $CH_3$, $C_2H_5$ or $C_3H_7$.

Specific examples of the more preferred organopolysiloxanes are shown below.

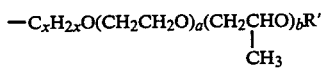

The content of the organopolysiloxane of this invention in an ink composition differs slightly by the kind of the organopolysiloxane, other components in the ink composition and so forth, but can be appropriately selected generally in the range of 0.1 to 50% by weight and preferably in the range of 0.5 to 20% by weight.

The ink composition of the present invention is, for example, a composition obtained by sufficiently mixing or kneading an ordinary vehicle for ink compositions, the aforementioned organopolysiloxane, a coloring agent and, if necessary, auxiliaries in a solvent or diluent. This ink composition may be used in an alternate form of adding the organopolysiloxane of the present invention to a commercially available printing ink.

In the above ink composition, as the vehicle for ink compositions, there can be used natural or processed resins such as drying oils, synthetic drying oils, rosins, copal, dammar, shellac, hardened rosins and rosin esters; synthetic resins such as phenolic resins, rosinmodified phenolic resins, 100% phenolic resins, maleic acid resins, alkyd resins, petroleum resins, vinyl resins, acrylic resins, polyamide resins, epoxy resins, aminoalkyd resins, polyurethane resins and aminoplast resins; cellulose derivatives such as nitrocellulose and ethylcellulose; glue; casein; dextrin; zein; and so forth. As the coloring agent, there can be used, for example, compounds used in conventional ink compositions such as inorganic or organic pigments. As the auxiliaries, there can be used, for example, waxes, greases, plasticizers, stabilizers, drying agents, supplemental drying agents, thickners, dispersants, fillers and other known auxiliaries.

The ink composition of the present invention can be prepared by uniformly mixing or kneading the aforementioned organopolysiloxane, the vehicle for ink compositions and, if necessary, other additives by an ordinary method such as, for example, the roll mill method, the ball mill method, the attritor method and the sand mill method.

It has been found out that, in the preferred embodiment of this invention, a mixture or a reaction product between said organopolysiloxane and a resin or oil miscible therewith can be added as an ink additive to a commercially available ordinary ink or at the time of ink manufacture, whereby the non-image area is not stained, the image is given a sufficient density, no emulsification is caused even by printing over a long period of time or by different printing plates or dampening solutions, and thus a lithographic printing using a dampening solution which has a large tolerance for change of printing conditions becomes available.

In the above-mentioned ink additive of the present invention, the mixture refers to a product wherein said organopolysiloxane and a resin or oil are uniformly mixed as a blend without causing any chemical reaction, and the reaction product refers to a product wherein the functional groups of said organopolysiloxane and the functional groups of a resin or oil cause chemical reaction at least partially and thereby a uniform blend or reaction product is formed. The previously defined hydrophilic group as a functional group of said organopolysiloxane does not lose its effect by its reaction with the resin or oil. That is, it is necessary that the hydrophilic group of said organopolysiloxane remains even when said organopolysiloxane is used in the above mentioned form of the ink additive.

As described in the above mentioned Japanese Patent Laid-Open Publication, an organopolysiloxane or a modified product between this organopolysiloxane and a resin or oil is said to act as a reducing agent for adhesitivity of a printing ink to the non-image area of a plate for dry lithographic printing and thereby to effectively reduce background staining of the plate. However, it was a real surprise that an ink composition containing a mixture or reaction product of the hydrophilic group-containing organopolysiloxane with the resin or oil showed various meritorious effects for a plate for lithographic printing using a dampening solution, that is, the composition causes no emulsification, causes no background staining and assures a sufficient printing density of the image area.

It has been found out that the ink additive of the present invention has a advantage that it can be added to any ordinary ink composition of commercial availability or added at the time of ink manufacture, without causing any compatibility problem.

As the resin or oil used in the ink additive of the present invention, any aforementioned known vehicle for ink compositions can be used. A vehicle well miscible with the hydrophilic group-containing organopolysiloxane used is chosen.

The ink additive of the present invention can be used as a mere mixture between a hydrophilic groupcontaining organopolysiloxane and a resin or oil and also as a modified product between these two substances which is obtained by heating said organopolysiloxane with one member selected from alkyd resins, aminoalkyd resins, phenolic resins, rosin-modified phenolic resins, epoxy resins, acrylic resins, vegetable oils, etc. which are described in the aforementioned Japanese Patent Laid-Open Publication No. 4107/1973. Particularly, an ink additive obtained from reaction of 100° to 200° C. and about 1 to 5 hr is preferable. Reaction at a high temperature of 200° C. or higher had better be avoided. The amount of said organopolysiloxane used relative to a resin or oil is optional but is usually preferred to be 3 to 60% by weight.

The content of the mixture or reaction product between the organosiloxane and the resin or oil of the present invention in an ink composition differs slightly by the kind of the ink additive, other components of the ink composition, etc. The content can be appropriately selected generally in the range of 0.1 to 70% by weight and preferably in the range of 0.5 to 30% by weight.

The ink composition of the present invention can be prepared by uniformly mixing or kneading the aforementioned ink additive of the present invention, a vehicle for ink compositions and, if necessary, other additives by an ordinary method such as, for example, the roll mill method, the ball mill method, the sand mill method or the like.

The ink composition of the present invention can be applied to all plates for lithographic printing using a dampening solution. In this case, the dampening solution can also vary widely, and not only water is used but also conventionally known substances such as a desensitization accelerator, a buffering agent, a preservative and a wetting agent can be added to water to improve the activity of the dampening solution. For example, one or more members selected from the following substances can be added to water. Gum arabic, carboxymethyl cellulose, sodium alginate, polyvinyl pyrrolidone, polyvinyl imidazole, copolymer of polyvinyl methyl ether and maleic anhydride, carboxymethyl starch, ammonium alginate, oxidized cellulose alginate, methyl cellulose, sufates (sodium sulfate, ammonium sulfate, etc.) phosphoric acid, nitric acid, zincic acid, tannic acid, salts of these four acids, polyol compounds having two or more hydroxyl groups (polyethylene glycol, ethylene glycol, propylene glycol, glycerol, diethylene glycol, hexylene glycol, etc.), organic weak acids (citric acid, succinic acid, tartaric acid, adipic acid, ascorbic acid, propionic acid, etc.), polyacrylic acid, ammonium dichromate, chromium alum, alginic acid-propylene glycol ester, salts of aminopolycarboxylic acids (sodium ethyelenediaminetetraacetate, etc.), inorganic colloids (colloidal silica, etc.), surfactants, etc.

Besides the above mentioned substances, organic solvents miscible with water such as methanol, dimethylformamide, dioxane and the like as well as coloring agents for identification and appearance improvement of dampening solution such as phthalocyanine dyes, Malachite Green, ultramarine and the like can also be added in slight quantities.

The present invention will be explained below by way of typical examples, but is not restricted by these examples.

EXAMPLE 1

Using inks containing a silicone-modified alkyd resin as an ink additive and Silver Master (brand name for a lithographic printing plate using the silver complex diffusion transfer method produced by Mitsubishi Paper Mills Ltd.), printing was made by a A.B. Dick 350 CD lithography printer (brand name for an offset printer manufactured by A.B.Dick Co.) with the below-mentioned dampening solution being supplied. When an ink (A) produced by the below-mentioned method and containing a silicone-modified alkyd resin ($a_1$) as an additive was used, even after continuous printing of more than 15,000 sheets, there was no background staining, the ink density on printed sheets was high and there was no emulsification of the ink. On the other hand, when an ink (B) was used which was produced by the same method as for the ink (A) except that the below-mentioned compound (b) was used as an organopolysiloxane in the silicone-modified alkyd resin, emulsification occured and background staining appeared after continuous printing of more than 8,000 sheets, and further the ink density on printed sheets was low.

| Composition of Dampening Solution | |
|---|---|
| o-Phosphoric acid | 10 g |
| Nickel nitrate | 5 g |
| Sodium nitrite | 5 g |
| Ethylene glycol | 100 g |
| Colloidal silica (20% solution) | 23 ml |

Water is added to the above to make a total volume 20 l.

| Composition and Production of Ink (A) | |
|---|---|
| Composition | |
| Carbon black for printing inks | 200 |
| Phthalocyanine Blue | 50 |
| Rosin-modified phenolic resin | 200 |
| Silicone-modified alkyd resin ($a_1$) | 200 |
| Linseed oil | 100 |
| High boiling solvent (O Solvent H) | 200 |
| Wax compound | 40 |
| Cobalt naphthenate (metal content 7.5%) | 10 |
| Total | 1,000 parts |

The above mixture was uniformly kneaded by a three-roll mill to obtain the ink (A).

| Production of the Silicone-modified Alkyd Resin ($a_1$) | |
|---|---|
| Phthalic anhydride | 100 parts |
| Oleic acid | 50 parts |
| Glycerine | 50 parts |
| Organopolysiloxane (1) aforementioned | 25 parts |
| Isophorone | 25 parts |
| Butyl cellosolve | 200 parts |

The above mixture was reacted for 2 hr at 150° C. to obtain the silicone-modified alkyd resin ($a_1$).

Composition and Production of Ink (B)

The ink (B) was produced by the same method as for the ink (A) except that the organopolysiloxane (1) used in the ink (A) was replaced by the following compound (b).

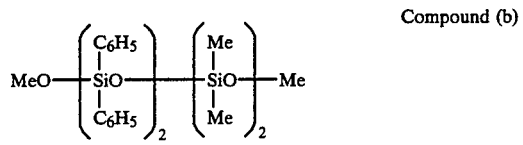

Compound (b)

EXAMPLE 2

In the ink (A) of Example 1, Disazo Yellow CARMIN 6B and Phthalocyanine Blue were used as pigments, whereby a new ink was successfully produced. This ink was confirmed to give good printing (with no background staining) for the lithography plate used in Example 1 which tends to cause background staining when a colored ink is used.

EXAMPLE 3

All components excluding the organopolysiloxane (1) used for the preparation of the silicone-modified alkyd resin ($a_1$) of Example 1 were kneaded with the organopolysiloxane (1) at the normal temperature to obtain an ink additive. This additive was used in place of the silicone-modified alkyd resin ($a_1$) in the Ink (A) whereby an ink was produced. This ink gave a result similar to that of the Ink (A), which proved that the ink additive of the present invention need not be necessarily be produced from reaction with heating.

EXAMPLE 4

Example 1 was repeated except that the organopolysiloxane (1) used in production of the silicone-modified alkyd resin ($a_1$) was replaced by the afore-mentioned organopolysiloxanes (2), (5), (6), (7), (8) and (12), respectively. Respective inks gave similar results to that of the Ink (A). The production method of a silicone-modified alkyd resin is described in detail in Japanese Patent Laid-Open Publication Nos. 71410/1975 & 71411/1975, etc.

EXAMPLE 5

Using the following ink, printing was made in the same manner as in Example 1, whereby a result similar to that of the Ink (A) of Example 1 was obtined.

| Composition of the Ink | |
|---|---|
| Carbon black for printing inks | 200 |
| Phthalocyanine Blue | 50 |
| Rosin-modified phenolic resin varnish ($a_2$) | 400 |
| Wax compound | 40 |
| Cobalt naphthenate (metal content 7.5%) | 10 |

-continued

| | |
|---|---|
| Manganese naphthenate (metal content 6.5%) | 10 |
| O Solvent H (Nippon Oil Co., Ltd.) | 290 |
| Total | 1,000 parts |

| | |
|---|---|
| Composition of the Rosin-modified Phenolic Resin Varnish (a₂) | |
| Rosin-modified alkylphenol resin | 500 |
| Silicone-modified linseed oil (a₂₁) | 300 |
| Dehydrated castor oil | 200 |
| Total | 1,000 parts |

| | |
|---|---|
| Production of the Silicone-modified Linseed Oil (a₂₁) | |
| Linseed Oil | 700 |
| The organopolysiloxane (2) | 300 |
| Total | 1,000 parts |

The above mixture was subjected to reaction for 3 hr at 150° C. to obtain an ink additive of the present invention.

In the above ink, the organopolysiloxane (2) was replaced by the organopolysiloxanes (1) and (6), respectively. Resulting two inks also gave similar results.

The production method of a silicone-modified vegetable oil is described in detail in, for example, Japanese Patent Laid-Open Publication Nos. 21906/1976 & 21907/1976, etc.

EXAMPLE 6

The ink additives of the present invention used in Examples 1 to 5 were added by 10% by weight to 7 kinds of commercially available ink compositions each different in ink tack value and color, and each mixture was kneaded thoroughly. Resulting inks and the commercially available inks as such were used for printing. In each comparative case (added ink vs non-added ink), a result similar to that of Example 1 was obtained.

EXAMPLE 7

Example 6 was repeated by using a commercially available PS plate and a zinc oxide-using plate together with respective dampening solutions. In both plates, striking differences in printing performance were seen between added inks and non-added inks.

EXAMPLE 8

Example 1 was repeated except that two inks containing an organopolysiloxane of the present invention and a comparative organopolysiloxane, respectively, were produced according to the below-mentioned compositions. When an ink (C) containing an organopolysiloxane of the present invention was used, there was no background staining even after continuous printing of more than 8,000 sheets, the ink density on printed sheets was high and there was little emulsification of ink. On the other hand, when an ink (D) was used which was same as the ink (C) except that the below-mentioned organopolysiloxane (b) was used as an organopolysiloxane, emulsification occured, background staining appeared before 3,000 sheets, and further the ink density on printed sheets was low.

| | |
|---|---|
| Composition and Production of Ink (C) | |
| Composition | |
| Carbon black for printing inks | 250 |
| Rosin-modified phenolic resin | 300 |
| Wax compound | 40 |
| The organopolysiloxane (1) | 100 |
| Cobalt naphthenate (metal content 7.5%) | 10 |
| Manganese naphthenate (metal content 6.5%) | 10 |
| O Solvent H (Nippon Oil Co., Ltd.) | 290 |
| Total | 1,000 parts |

The above mixture was uniformly kneaded by the use of a three-roll mill to obtain the ink (C).

The ink (D) was produced in the same method as for the ink (C) except that the organopolysiloxane (1) in the ink (C) was replaced by the following compound (b) (comparative organopolysiloxane).

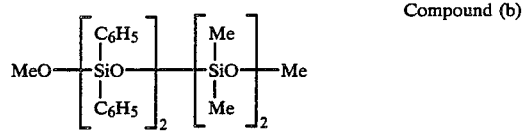

Compound (b)

EXAMPLE 9

In the ink (C) of Example 8, Disazo Yellow CARMIN 6B and Phthalocyanine Blue were used as pigments, whereby a new ink was successfully produced. This ink was confirmed to give good printing (with no background staining) for the lithographic printing plate used in Example 8 which tends to cause background staining when a colored ink is used.

EXAMPLE 10

Example 8 was repeated except that the organopolysiloxane (1) used in the ink (C) was replaced by the aforementioned organopolysiloxanes (2), (6) and (8), respectively. Respective inks gave similar results to that of the ink (C).

EXAMPLE 11

The organopolysiloxanes (1), (2), (3), (5), (7), (8) and (12) were added by 10% by weight to 7 kinds of commercially available ink compositions each different in ink tack and color, and each mixture was kneaded thoroughly. Resulting inks and the above commecially available inks as such were used for printing. In each comparative case (added ink vs non-added ink), a result similar to that of Example 8 was obtained.

EXAMPLE 12

Example 8 was repeated except that the organopolysiloxane (1) was replaced by the organopolysiloxanes (15), (16), (17), (18) and (19), respectively. Respective inks gave similar results to that of the ink (A).

What is claimed is:

1. A lithographic printing process using a printing ink and a dampening solution characterized by using a printing ink containing as an ink additive an organopolysiloxane having at least one hydrophilic group.

2. A lithographic printing process according to claim 1, wherein the organic polysiloxane having at least one hydrophilic group contains at least one of the components represented by [(R)SiO(G)], [(G)(R)₂SiO₁/₂] and [(G)SiO₃/₂], wherein R is a substituent selected from the group consisting of a non-substituted or substituted alkyl group, alkoxy group and aromatic group and may be same or different, and G is a hydrophilic group or a group containing a hydrophilic group.

3. A lithographic printing process according to claim 2, wherein the hydrophilic group is selected from the group consisting of a hydroxyl group, carboxyl group, sulfonic acid group, thiol group, amino group and an ammonium group.

4. A lithographic printing process according to claim 3, wherein the hydrophilic a group is a hydroxyl group.

5. A lithographic printing process according to claim 4, wherein the hydroxyl group is a a hydroxyl group derived from a polyol compound.

6. A lithographic printing process according to claim 5, wherein the polyol compound is a polyalkylene glycol.

7. A lithographic printing process according to claim 1, wherein the organopolysiloxane has any one of the following average composition formula (A), (B), (C) and (D):

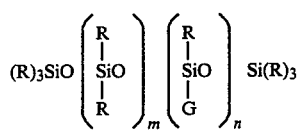
(A)

(B)

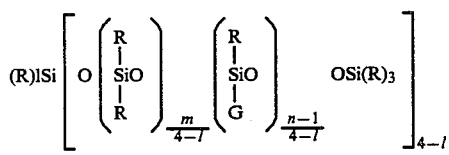
(C)

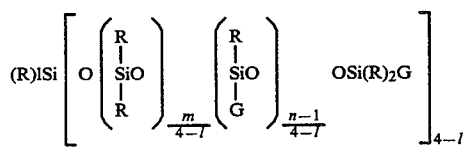
(D)

wherein R is a substitutent selected from the group consisting of a non-substituted or substituted alkyl group, alkoxy group and aromatic group and may be same or different, and G is a hydrophilic group or a group containing the hydrophilic group, m an an average value of 0 to 100, n an an average value of 1 to 50, l is an average value of 0 to 1.

8. A lithographic printing process according to claim 7, wherein the organopolysiloxane contains at least one substituent (M) and at least one substituent (N) as G of the average composition formula (A), (B), (C) and (D)

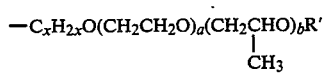
(M)

wherein x is an integer of 0 to 4, a has an average value of 1 to 50, b has an average value of 0 to 50 and R' is selected from the group consisting of a hydrogen atom, an alkyl group and an acyl group:

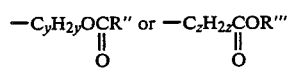
(N)

wherein y is an integer of 0 to 4, R" and R'" are a saturated or unsaturated hydrocarbon of 1 to 30 carbon atoms having no terminal unsaturated bond and z is an integer of 2 to 30.

9. A lithographic printing process according to claim 1, wherein an amount of the organopolysiloxane is 0.1–50% by weight based on the total amount of ink.

10. A lithographic printing process according to claim 1, wherein there as an ink additive is used a mixture or a reaction product between the organopolysiloxane having at least one hydrophilic group and a resin or oil miscible therewith.

11. A lithographic printing process according to claim 1, wherein the process is an offset printing process.

12. A lithographic printing process according to claim 11, wherein the offset printing process uses a silver salt printing plate.

13. An ink composition utilized in lithographic printing using a dampening solution which comprises as an ink additive an organopolysiloxane having at least one hydrophilic group, said organopolysiloxane containing at least one of the components represented by [(R)SiO(G)], [(G)(R)$_2$SiO$_{1/2}$] and [(G)SiO$_{3/2}$], wherein R is a substitutent selected from the group consisting of a non-substituted or substituted alkyl group, alkoxy group and aromatic group and may be same or different, and G is a hydrophilic group or a group containing a hydrophilic group, and said hydrophilic group being a hydroxyl group.

14. An ink composition according to claim 13, wherein the hydroxyl group is a hydroxyl group derived from a polyol compound.

15. An ink composition according to claim 14, wherein the polyol compound is a polyalkylene glycol.

16. An ink composition according to claim 13, wherein the organopolysiloxane has any one of the following average composition formula (A), (B), (C) and (D),

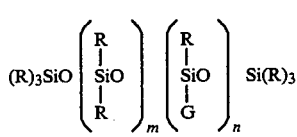
(A)

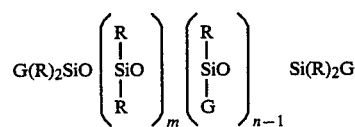
(B)

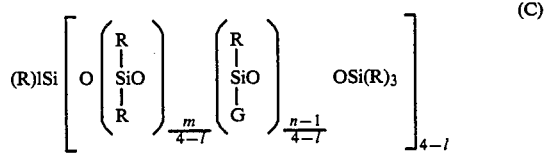
(C)

-continued

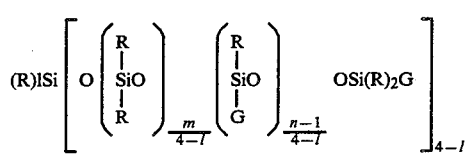 (D)

wherein R is a substituent selected from the group consisting of a non-substituted or substituted alkyl group, alkoxy group and aromatic group and may be same or different, and G is a hydrophilic group or a group containing a hydrophilic group, m has an average value of 0 to 100, n is an average value of 1 to 50, l has an average value of 0 to 1, and the organopolysiloxane contains at least one substituent (M) and at least one substituent (N) as G of the average composition formula (A), (B), (C) and (D),

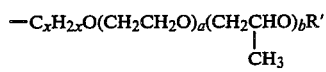 (M)

wherein x has an integer of 0 to 4, a is an average value of 1 to 50, b has an average value of 0 to 50 and R' is selected from the group consisting of a hydrogen atom, an alkyl group and an acyl group,

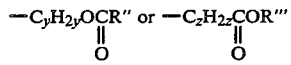 (N)

wherein y is an integer of 0 to 4, R" and R''' are a saturated or unsaturated hydrocarbon of 1 to 30 carbon atoms having no terminal unsaturated bond and z is an integer of 2 to 30.

17. An ink composition according to claim 16 wherein the hydrophilic group is an alcoholic hydroxyl group as the sole hydrophilic group present.

18. An ink composition according to claim 13 wherein the hydoxyl group is an alcoholic hydroxyl group as the sole hydrophilic group present.

19. A lithographic printing process according to claim 7 wherein the hydrophilic group is an alcoholic hydroxyl group as the sole hydrophilic group present.

20. A lithographic printing process according to claim 4 wherein the hydroxyl group is an alcoholic hydroxyl group as the sole hydrophilic group present.

21. A lithographic printing process according to claim 1 wherein the hydrophilic group is an alcoholic hydroxyl group as the sole hydrophilic group present.

22. A lithographic printing process according to claim 9, wherein the amount of the organopolysiloxane is 0.5–20% by weight based on the total amount of ink.

* * * * *